United States Patent
Hixson-Goldsmith et al.

(10) Patent No.: US 7,265,942 B2
(45) Date of Patent: Sep. 4, 2007

(54) INDUCTIVE MAGNETIC HEAD WITH NON-MAGNETIC SEED LAYER GAP STRUCTURE AND METHOD FOR THE FABRICATION THEREOF

(75) Inventors: April Dawn Hixson-Goldsmith, Campbell, CA (US); Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 477 days.

(21) Appl. No.: 10/813,880

(22) Filed: Mar. 30, 2004

(65) Prior Publication Data

US 2005/0219745 A1    Oct. 6, 2005

(51) Int. Cl.
    *G11B 5/23* (2006.01)
(52) U.S. Cl. .................... 360/126; 29/603.15
(58) Field of Classification Search ............... 360/126; 29/603.15
    See application file for complete search history.

(56) References Cited

U.S. PATENT DOCUMENTS

| | | | | |
|---|---|---|---|---|
| 3,718,776 A | * | 2/1973 | Bate et al. ................. | 360/126 |
| 5,285,340 A | | 2/1994 | Ju et al. ..................... | 360/119 |
| 5,673,163 A | | 9/1997 | Cohen ........................ | 360/126 |
| 6,151,193 A | | 11/2000 | Terunuma et al. ......... | 360/126 |
| 6,173,486 B1 | | 1/2001 | Hsiao et al. ............. | 29/603.14 |
| 6,239,948 B1 | | 5/2001 | Wu et al. ................... | 360/120 |
| 6,600,629 B2 | | 7/2003 | Kanada et al. ............ | 360/120 |
| 6,724,569 B1 | * | 4/2004 | Chen et al. ................. | 360/119 |
| 6,833,976 B2 | * | 12/2004 | Hsu et al. ................... | 360/119 |
| 6,960,281 B2 | * | 11/2005 | Han et al. ............... | 204/192.34 |
| 6,975,485 B2 | * | 12/2005 | Hsu et al. ................... | 360/119 |
| 2002/0167759 A1 | | 11/2002 | Sato et al. ................. | 360/126 |
| 2003/0030940 A1 | | 2/2003 | Matono ....................... | 360/126 |
| 2003/0072970 A1 | | 4/2003 | Li et al. ..................... | 428/694 |

FOREIGN PATENT DOCUMENTS

| | | |
|---|---|---|
| JP | 61110319 | 5/1986 |
| JP | 62145523 | 6/1987 |
| JP | 11213332 | 8/1999 |
| JP | 2002140803 | 5/2002 |
| JP | 2002298310 | 10/2002 |

* cited by examiner

*Primary Examiner*—Angel Castro
*Assistant Examiner*—Christopher R. Magee
(74) *Attorney, Agent, or Firm*—Robert O. Guillot; Intellectual Property Law Offices

(57) ABSTRACT

A magnetic head including first and a second magnetic poles with a write gap layer disposed therebetween. In a first embodiment the write gap layer includes a non-magnetic, non-conductive first sublayer which is preferably comprised of Ta or Ti which is deposited upon the first magnetic pole to act as an adhesion layer. The write gap layer then includes a second sublayer which is formed of a non-magnetic, electrically conductive material which is preferably comprised of Rh or Ru. A P2 pole tip is electroplated upon the second sublayer, where the electrically conductive second sublayer is utilized to conduct electroplating current. In an alternative embodiment the write gap layer includes a third sublayer that is etchable in a reactive ion etch (RIE) process, and formed between the first and second sublayers. The third sublayer is preferably comprised of Ta or Ti.

28 Claims, 2 Drawing Sheets

INDUCTIVE MAGNETIC HEAD WITH NON-MAGNETIC SEED LAYER GAP STRUCTURE AND METHOD FOR THE FABRICATION THEREOF

BACKGROUND OF THE INVENTION

1. Field of the Invention

The present invention relates generally to magnetic heads for hard disk drives, and more particularly to the fabrication of a non-magnetic electrically conductive write gap structure between the magnetic poles of a write head portion of such magnetic head.

2. Description of the Prior Art

As is well known to those skilled in the art, standard magnetic heads include write head elements that include two magnetic poles, commonly termed the first magnetic pole (P1) and the second magnetic pole (P2) poles, with a write gap layer formed between them. During a data recording procedure, the passage of magnetic flux across the write gap between the two poles creates a magnetic field which influences a thin film layer of magnetic media on a hard disk that is located proximate the magnetic head, such that the changing magnetic flux creates data bits within the magnetic media. In a longitudinal magnetic head the size of the data bit is substantially determined by the size of a magnetic pole tip of the second magnetic pole, referred to herein as the P2 pole tip.

The continual quest for higher areal data recording densities of the magnetic media demands smaller bit sizes which may be achieved by reducing the thickness of the write gap layer and the size of the P2 pole tip. In the typical prior art magnetic head, the write gap material consists of a non-conductive, non-magnetic material such as alumina. The P2 pole tip is formed utilizing photolithographic techniques in which an electrically conductive seed layer comprised of a magnetic material, such as NiFe, is deposited upon the alumina write gap layer, and a patterned photoresist having a pole tip trench formed therein is fabricated upon the electrically conductive seed layer. Thereafter, the P2 pole tip is electroplated within the pole tip trench utilizing the electrically conductive seed layer to conduct electroplating current. Following the electroplating process the photoresist and uncovered seed layer is removed. As a result, the remaining seed layer that is disposed beneath the electroplated pole tip effectively becomes part of the pole tip through which magnetic flux flows. The thickness of the seed layer therefore contributes to the overall thickness of the P2 pole tip.

In more advanced magnetic heads, the magnetic pole tip material is formed with significantly improved magnetic properties than can be achieved in the magnetic seed layer. The improved magnetic properties are desirable to provide increased magnetic flux flow at greater magnetic flux densities in order to write smaller data bits to the magnetic media. In this situation, the relatively ordinary magnetic properties of the magnetic seed layer are detrimental to the desired magnetic flux flow through the P2 pole tip. The magnetic head of the present invention includes a non-magnetic, electrically conductive seed layer which aids in obtaining the desired magnetic flux flow through the P2 pole tip.

SUMMARY OF THE INVENTION

The magnetic head of the present invention includes a write head element having a first and a second magnetic pole with a write gap layer disposed therebetween. In a first embodiment the write gap layer includes a first sublayer which is deposited upon the first magnetic pole to act as an adhesion layer. The material comprising this first sublayer is non-magnetic and non-conductive. The write gap layer then includes a second sublayer which is formed of a non-magnetic, electrically conductive material. The P2 pole tip of the second magnetic pole is then photolithographically formed upon the second sublayer by fabricating a patterned photoresist upon the second sublayer in which a P2 pole tip trench is created. The P2 pole tip is then electroplated into the pole tip trench, where the electrically conductive second sublayer is utilized to conduct electroplating current. In a preferred embodiment, the adhesion layer is preferably comprised of Ta or Ti, having a thickness of from approximately 25 Å to approximately 200 Å with a preferred thickness of approximately 50 Å, and the second sublayer is preferably comprised of Rh or Ru having a thickness of from approximately 100 Å to approximately 1,000 Å, with a preferred thickness of approximately 500 Å.

In an alternative embodiment the write gap layer includes another sublayer that is formed between the adhesion sublayer and the electrically conductive non-magnetic second sublayer. This third sublayer is comprised of a material that is etchable in a reactive ion etch (RIE) process, and the third sublayer is preferable comprised of Ta, Ti, W, Mo or Si, and is formed with a thickness of from approximately 100 Å to approximately 1,000 Å, with a preferred thickness of approximately 600 Å. Where the third sublayer is included, the electrically conductive, non-magnetic second sublayer is preferably formed with a thickness of from approximately 100 Å to approximately 1,000 Å, with a preferred thickness of approximately 200 Å. The third sublayer is useful where a P1 pole notching process is to be undertaken in the fabrication of the magnetic head. The utilization of the RIE etchable third sublayer during a P1 pole notching process utilizing a reactive ion species results in reduced redeposition of etched material upon the sides of the P2 pole tip as compared to prior art P1 pole notching processes. This can also reduce the overall process time to mill the pole tip.

It is an advantage of the magnetic head of the present invention that it includes a write head having a non-magnetic, electrically conductive sublayer that facilitates the electroplating of the P2 pole tip of the magnetic head.

It is another advantage of the magnetic head of the present invention that it includes a P2 magnetic pole tip having more desirable magnetic flux flow characteristics.

It is a further advantage of the magnetic head of the present invention that it includes a write head with reduced sidewall redeposition during a P1 pole notching step.

It is an advantage of the hard disk drive of the present invention that it has increased areal data storage density.

It is another advantage of the hard disk drive of the present invention that it includes a magnetic head including a write head having a non-magnetic, electrically conductive sublayer that facilitates the electroplating of the P2 pole tip of the magnetic head.

It is a further advantage of the hard disk drive of the present invention that it includes a magnetic head having a write head element including a P2 magnetic pole tip having more desirable magnetic flux flow characteristics.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
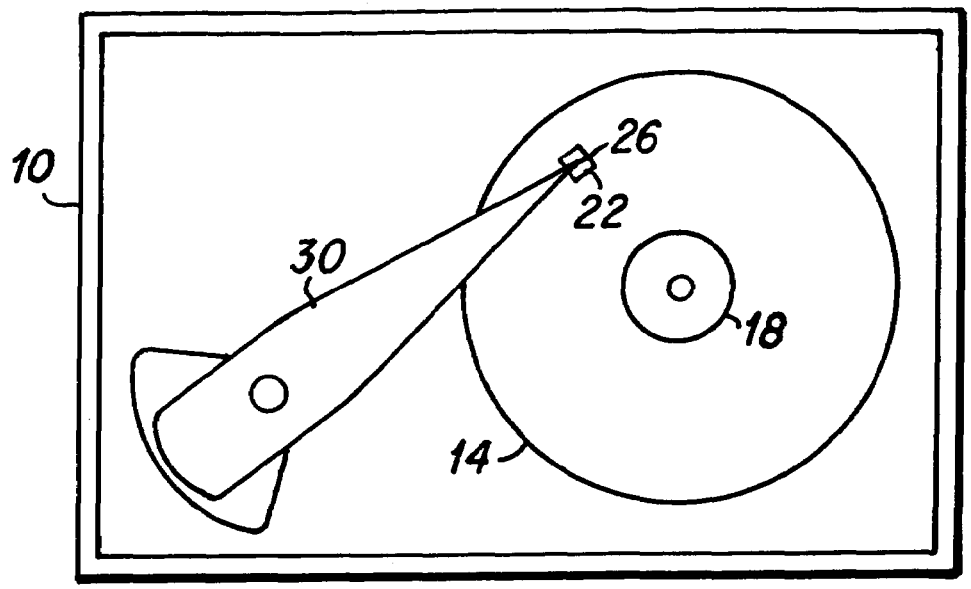
FIG. 1 is a top plan view that generally depicts a hard disk drive including a magnetic head of the present invention.

A simplified top plan view of a typical hard disk drive 10 which includes a magnetic head of the present invention is presented in FIG. 1. As depicted therein, at least one hard disk 14 is rotatably mounted upon a motorized spindle 18. A slider 22, having a magnetic head 26 disposed thereon, is mounted upon an actuator arm 30 to fly above the surface of each rotating hard disk 14, as is well known to those skilled in the art. The present invention includes improved features and manufacturing methods for such magnetic heads, and to better understand the present invention a prior art magnetic head is next described.

Figure 2:
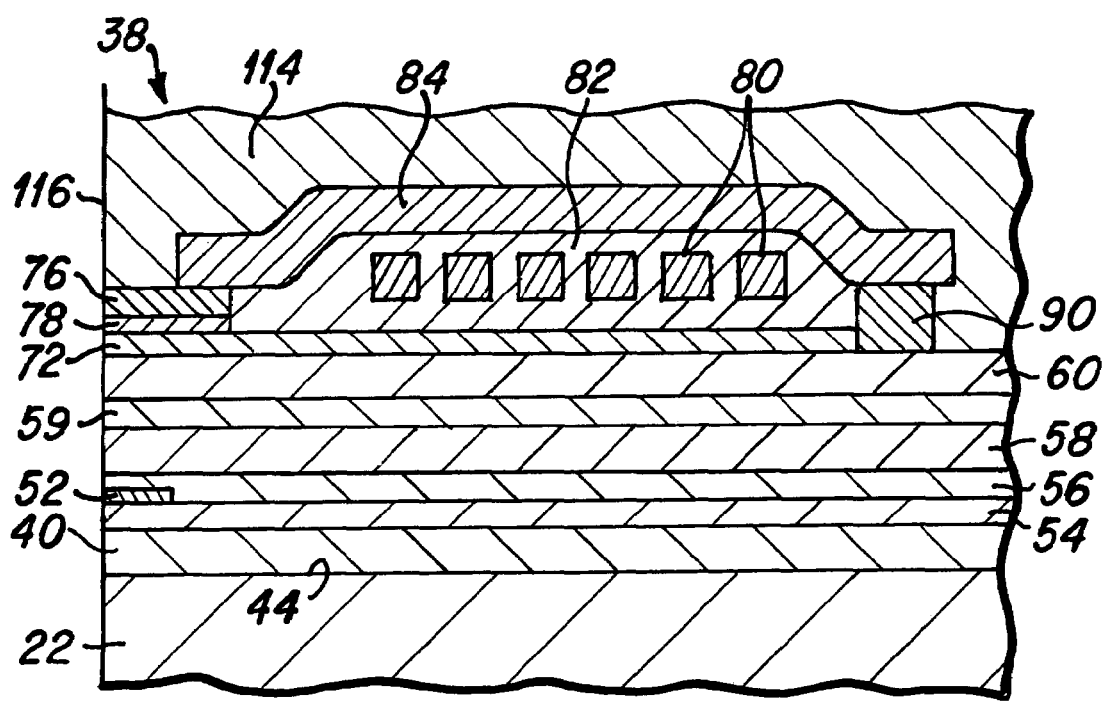
FIG. 2 is a side cross-sectional view depicting various components of a prior art magnetic head.

As will be understood by those skilled in the art, FIG. 2 is a side cross-sectional view that depicts portions of a prior art magnetic head 38, termed a longitudinal magnetic head. As is best seen in FIG. 2, the magnetic head 38 includes a first magnetic shield layer (S1) 40 that is formed upon a surface 44 of the slider body material 22. A read head sensor element 52 is disposed within electrical insulation layers 54 and 56 and a second magnetic shield layer (S2) 58 is formed upon the insulation layer 56. An electrical insulation layer 59 is then deposited upon the S2 shield 58, and a first magnetic pole (P1) 60 is fabricated upon the insulation layer 59.

Following the fabrication of the P1 pole 60, a write gap layer typically composed of a non-magnetic, non-conductive, non-metallic material such as alumina 72 is deposited upon the P1 pole 60. This is followed by the fabrication of a P2 magnetic pole tip 76, which includes the deposition of a seed layer 78 that is typically a magnetic electrically conductive metal, such as NiFe, followed by a photolithographic process including the deposition of a patterned photoresist layer (not shown) including a P2 pole tip trench. This is followed by the electroplating of the P2 pole tip 76 within the patterned photoresist trench, where the seed layer 78 acts to conduct electroplating electrical current. Following the electroplating of the P2 pole tip 76, the photoresist and exposed seed layer is removed, and an induction coil structure including coil turns 80 is then fabricated within insulation 82 above the write gap layer 72. Thereafter, a yoke portion 84 of the second magnetic pole is fabricated in magnetic connection with the P2 pole tip 76, and through back gap element 90 to the P1 pole 60. Electrical leads (not shown) are subsequently fabricated and a further insulation layer 114 is deposited to encapsulate the magnetic head. The magnetic head 38 is subsequently fabricated such that an air bearing surface (ABS) 116 is created.

It is to be understood that there are many detailed features and fabrication steps of the magnetic head 38 that are well known to those skilled in the art, and which are not deemed necessary to describe herein in order to provide a full understanding of the present invention.

Figure 3:
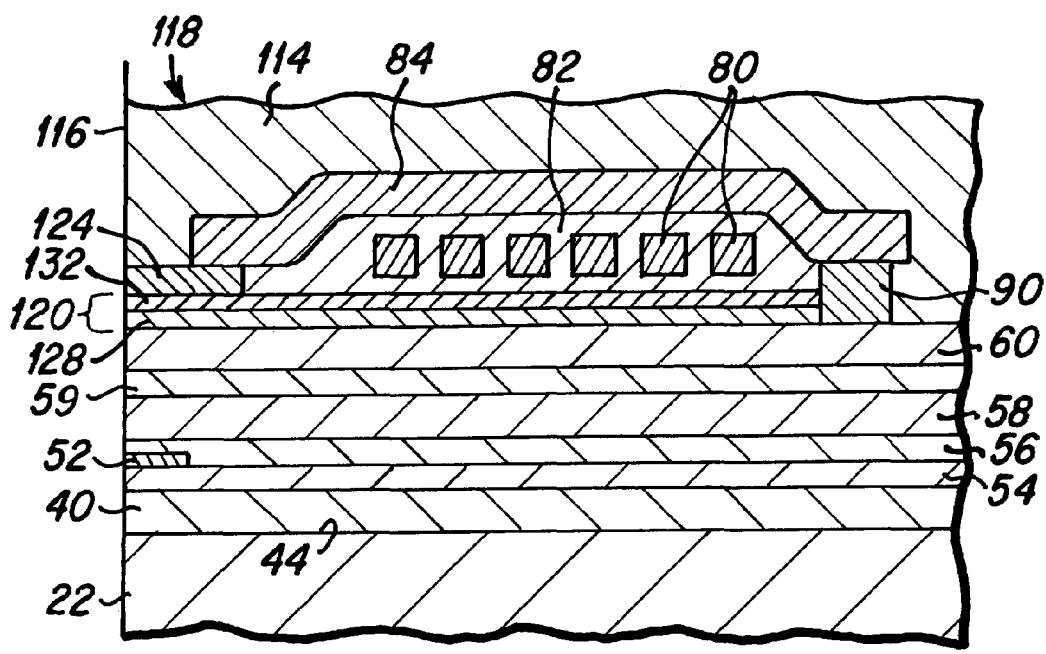
FIG. 3 is a side cross-sectional view depicting various components of the magnetic head of the present invention.

FIG. 3 is a side cross-sectional view depicting various components of a magnetic head 118 of the present invention that may be used as the magnetic head 26 in the disk drive of FIG. 1. The significant features of the present invention relate to the structure of the write gap that is fabricated between the magnetic poles. Therefore, the magnetic head of the present invention includes many similar features and structures to those of the prior art magnetic head described hereabove, and such similar features and structures are numbered identically for ease of comprehension.

As depicted in FIG. 3, the magnetic head 118 of the present invention includes a first magnetic shield layer (S1) 40 that is formed upon a surface 44 of the slider body material 22. A read head sensor element 52 is disposed within electrical insulation layers 54 and 56 and a second magnetic shield layer (S2) 58 is formed upon the insulation layer 56. An electrical insulation layer 59 is then deposited upon the S2 shield 58, and a first magnetic pole (P1) 60 is fabricated upon the insulation layer 59.

Figure 4:
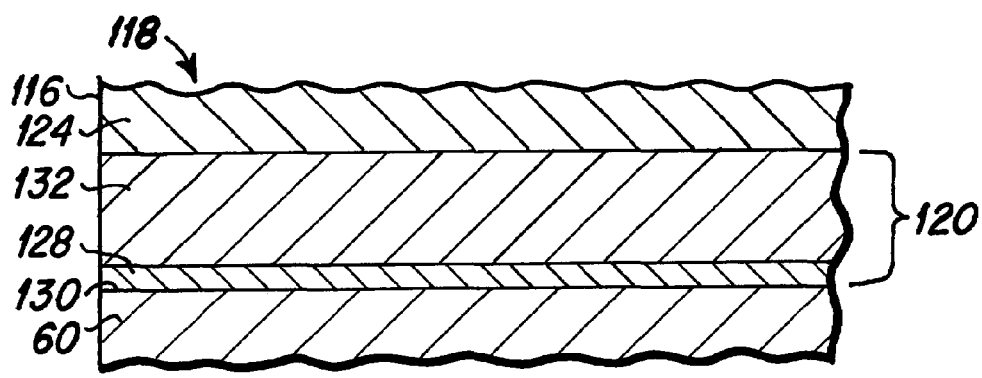
FIG. 4 is an enlarged cross-sectional view depicting detailed features of the write gap structure of the present invention.

Following the fabrication of the P1 pole 60, an electrically conductive write gap layer 120 of the present invention is fabricated upon the P1 pole 60 in steps that are described in detail herebelow with the aid of FIG. 4. This is followed by the fabrication of a P2 magnetic pole tip 124, which includes a photolithographic process including the deposition of a patterned photoresist layer (not shown) including a P2 pole tip trench. This is followed by the electroplating of the P2 pole tip 124 within the patterned photoresist trench, where the write gap layer acts to conduct electroplating electrical current. Following the electroplating of the P2 pole tip 124, the photoresist is removed and an induction coil structure including coil turns 80 is then fabricated within insulation 82 above the write gap layer 120. Thereafter, a yoke portion 84 of the second magnetic pole is fabricated in magnetic connection with the P2 pole tip 124, and through back gap element 90 to the P1 pole 60. Electrical leads (not shown) are subsequently fabricated and a further insulation layer 114 is deposited to encapsulate the magnetic head. The magnetic head 118 is subsequently fabricated such that an air bearing surface (ABS) 116 is created.

As is best seen in the expanded side cross-sectional view of FIG. 4, a first preferred embodiment of the write gap layer 120 of the present invention includes a first sublayer 128 that is deposited across the surface of the wafer following the fabrication of the P1 pole 60. The sublayer 128 is deposited to act as an adhesion layer between the metallic P1 pole layer surface 130 and the subsequent sublayers of the write gap layer 120 of the present invention. In the preferred embodiment, the adhesion sublayer 128 is preferably comprised of a metallic, non-magnetic material such as preferably Ta or Ti, or other acceptable materials such as Cr or NiCr or a combination thereof. The adhesion sublayer 128 is fabricated with a thickness of from approximately 25 Å to approximately 200 Å, with a preferred thickness of approximately 50 Å.

Following the deposition of the adhesion sublayer 128, a second sublayer 132 of the write gap layer 120 is deposited. The second sublayer 132 is preferably comprised of a non-magnetic, electrically conductive metal, such as preferably Rh or Ru, or other acceptable materials such as Ir, Mo, W, Au, Be, Pd, Pt, Cu, PtMn, and Ta or a combination thereof. The sublayer 132 is formed with a thickness of from approximately 100 Å to approximately 1000 Å, with a preferred thickness of approximately 500 Å.

Following the deposition of the non-magnetic, electrically conductive second sublayer 132, the P2 pole tip 124 is directly fabricated thereon, without the necessity for depositing a pole tip seed layer as is done in the prior art (such as seed layer 78 of FIG. 2). That is, the non-magnetic electrically conductive write gap sublayer 132 is utilized to conduct electroplating current for the electroplating of the P2 pole tip 124. Therefore, following the deposition of the electrically conductive write gap sublayer 132, a photolithographic process similar to the prior art P2 pole tip fabrication process is conducted, wherein a patterned photoresist (not shown) is fabricated upon the sublayer 132, followed by the electroplating of the P2 pole tip 124 within a P2 pole tip trench formed within the photoresist. The electroplating electrical current flows through the sublayer 132 during the electroplating process. Thereafter, the photoresist is removed, such as with the use of a wet chemical stripper, and sublayers 132 and 120 are preferably removed using an ion etching process from all areas except protected areas beneath the P2 pole tip 124. Thereafter, the induction coil structure, including coil turns 80, yoke portion 84 of the second magnetic pole and further structures as are known in the prior art are fabricated to complete the fabrication of the magnetic head of the present invention.

Significant features of the structure of the write gap layer 120 of the present invention are that the adhesion sublayer 128 serves to effectively join the metallic material of the magnetic P1 pole 60 with the metallic electrically conductive sublayer 132 of the write gap layer 120. Owing primarily to material stress within the P1 magnetic pole material, typically NiFe, delamination of a completed magnetic head at the write gap may occur where an adhesion sublayer is not utilized between the metallic material of the P1 pole 60 and the metallic material forming the write gap sublayer 132. Also, it is desirable that the material that forms the sublayer 132 does not readily form an oxide, such that corrosion and tribological problems at the ABS are avoided, and that the sublayer 132 can conduct current to the P2 pole tip in the electroplating process and be plated upon more easily.

The fabrication of the write gap layer 120, utilizing an electrically conductive, non-magnetic material in sublayer 132, allows both a reduction in the thickness of the write gap layer and a reduction in the overall thickness of the P2 magnetic pole tip 124. That is, a good electrical conductor, such as Rh, allows for the use of a thin sublayer 132 while still supplying adequate electroplating current to plate up the P2 pole tip. Also, because the sublayer 132 is non-magnetic, the overall thickness of the magnetic P2 pole tip is reduced as compared to the prior art P2 pole tip, in which the magnetic seed layer (78 in FIG. 2) effectively becomes a part of the P2 pole tip due to magnetic flux flow therethrough.

In more advanced magnetic heads of the prior art, the P2 pole tip is formed with magnetic material such as a CoFe alloy having significantly improved magnetic flux flow properties that are superior to the flux flow properties of the prior art NiFe magnetic seed layer. The improved magnetic properties are desirable to provide increased magnetic flux flow at greater magnetic flux densities in order to write smaller data bits to the magnetic media. In this case, it is desirable that the thickness of the write gap be reduced to accommodate the higher bit density. The write gap layer 120 of the present invention, with its adhesion sublayer 128 are important in this instance where the properties of the electroplated pole may include a large amount of stress which can cause delamination.

Figure 5:
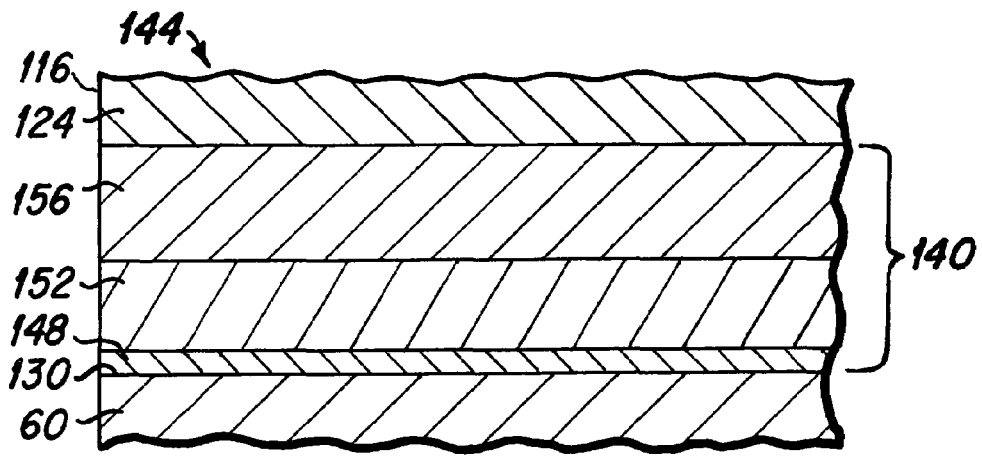
FIG. 5 is an enlarged cross-sectional view depicting detailed features of an alternative write gap structure of the present invention.

FIG. 5 is an enlarged side cross-sectional view depicting an alternative embodiment of a write gap layer 140 of a magnetic head 144 of the present invention. As depicted therein, the write gap layer 140 basically includes three sublayers 148, 152 and 156. The first sublayer 148 is an adhesion sublayer and it is substantially identical to the adhesion sublayer 128 of the magnetic head 118 depicted in FIG. 4 and described hereabove. Specifically, the adhesion sublayer 128 is preferably comprised of a metallic, non-magnetic material such as preferably Ta or Ti, or other acceptable materials such as Cr or NiCr or a combination thereof. The adhesion sublayer 128 is fabricated with a thickness of from approximately 25 Å to approximately 200 Å, with a preferred thickness of approximately 50 Å.

The middle layer 152 is comprised of a non-magnetic material, such as Ta, Ti, W, Mo and Si, which also etchable in a reactive ion etch (RIE) process, such as with the use of oxygen or fluorine active species, as is known to those skilled in the art. The thickness of the middle sublayer 152 may be from approximately 100 to approximately 1,000 Å, with a preferred thickness of approximately 600 Å.

The third sublayer 156 of the write gap layer 140 is substantially similar to the second sublayer 132 of the write gap layer 120 of the magnetic head 118 depicted in FIG. 4 and described hereabove. Specifically, the third sublayer 156 is composed of a non-magnetic, electrically conductive material such as Rh or Ru, or other acceptable materials such as Ir, Mo, W, Au, Be, Pd, Pt, Cu, PtMn, and Ta or a combination thereof, having a thickness of from approximately 100 Å to approximately 1,000 Å with a preferred thickness of approximately 200 Å. The third sublayer 156 acts as an electrical conductor for the electroplating of the P2 pole tip 124 as has been described hereabove, and where the middle sublayer 152 is also electrically conductive it aids in the conduction of electrical current.

As is well known to those skilled in the art, a P1 pole notching step is often conducted during the fabrication of a longitudinal magnetic head to substantially eliminate side writing from the P2 pole tip. Specifically, following the fabrication of the P2 pole tip, an ion beam etching step is conducted where the P2 pole tip acts as a etching mask, and the write gap layer and portions of the P1 pole immediately along side of the P2 pole tip are etched away. As a result of the notching step, undesirable side writing of the magnetic head that is caused by the unwanted flow of magnetic flux from the sides of the P2 pole tip to the P1 pole is substantially reduced.

The significance of the middle sublayer 152 of the write gap structure 140 of the magnetic head 144 of the present invention is that because it is etchable in an RIE process, the P1 pole notching step is more easily conducted than it is in the prior art P1 pole notching process, where a standard ion beam etching process is utilized. That is, the ion beam P1 pole notching step of the present invention can proceed with greater efficiency by the addition of a reactive component to the ion milling process, because the RIE etchable material of sublayer 152 becomes a gaseous compound in the RIE process, and redeposition of etched material is minimized.

Therefore, a write gap layer 140 having three sublayers 148, 152 and 156 provides some improved processing characteristics over the write gap layer 120 having two sublayers 128 and 132. However each of the write gap layers 120 and 140 include the non-magnetic, electrically conductive sublayer 132, 156 respectively which acts to carry electrical current in the electroplating of the P2 pole tip thereon. As a result, the magnetic head 118 and 144 of the present invention can be fabricated with a thinner write gap layer and a smaller P2 pole tip. This ultimately facilitates the creation of smaller data bits being written to the magnetic media of a hard disk drive of the present invention, thus increasing the areal data storage density of the hard disk of the hard disk drive and the present invention.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

The invention claimed is:

1. A magnetic head, comprising:
   a first magnetic pole;
   a second magnetic pole;
   a write gap layer being disposed between said first and second magnetic poles, where said write gap layer includes at least two sublayers, including an adhesion sublayer and an electrically conductive, non-magnetic sublayer, and wherein said adhesion sublayer is disposed upon said first magnetic pole, and said second magnetic pole is disposed directly upon said electrically conductive, non-magnetic sublayer.

2. A magnetic bead as described in claim 1 wherein said electrically conductive, non-magnetic sublaver serves as an electrical current conductor in a process for the electroplating of said second magnetic pole.

3. A magnetic head as described in claim 1, wherein said adhesion sublayer is comprised of a material selected from the group consisting of Ta, Ti, Cr and NiCr.

4. A magnetic head as described in claim 1 wherein said electrically conductive, non-magnetic sublayer is comprised of a material selected from the group consisting of Rh, Ru, Jr. Mo, W. Au, Be, Pd, Pt, Cu, PtMn, and Ta.

5. A magnetic head as described in claim 1 wherein said adhesion sublayer is formed with a thickness of from approximately 25 Å to approximately 200 Å.

6. A magnetic head as described in claim 5 wherein said adhesion sublayer is formed with a thickness of approximately 50 Å.

7. A magnetic head as described in claim 1 wherein said electrically conductive, non-magnetic sublayer is formed with a thickness of from approximately 100 Å to approximately 1000 Å.

8. A magnetic head as described in claim 5 wherein said electrically conductive, non-magnetic sublayer is formed with a thickness of approximately 500 Å.

9. A magnetic head as described in claim 1 wherein said second magnetic pole is comprised of a CoFe alloy.

10. A magnetic head as described in claim 1 wherein said write gap layer also includes a third sublayer that is disposed between said adhesion sublayer and said electrically conductive, non-magnetic sublayer, and wherein said third sublayer is comprised of a material that is etchable in a reactive ion etch process.

11. A magnetic head as described in claim 10 wherein said third sublayer is formed with a thickness of from approximately 100 Å to approximately 1,000 Å.

12. A magnetic head as described in claim 11 wherein said third sublayer is formed with a thickness of approximately 600 Å.

13. A magnetic head as described in claim 10 wherein said third sublayer is comprised of a material selected from the group consisting of Ta, Ti, W, Mo and Si.

14. A magnetic head as described in claim 1 wherein said adhesion layer is disposed directly upon said first magnetic pole;
   wherein said adhesion sublayer is comprised of a material selected from the group consisting of Ta, Ti, Cr and NiCr, and is formed with a thickness of from approximately 25 Å to approximately 200 Å;
   wherein said electrically conductive, non-magnetic sublayer is comprised of a material selected from the group consisting of Rh, Ru, Ir, Mo, W, Au, Be, Pd, Pt, Cu, PtMn, and Ta and is formed with a thickness of from approximately 100 Å to approximately 1000 Å;
   wherein said write gap layer also includes a third sublayer that is disposed between said adhesion sablayer and said electrically conductive, non-magnetic sublayer, and wherein said third sublayer is comprised of a material that is etchable in a reactive ion etch process, and
   wherein said third sublayer is comprised of a material selected front the group consisting of Ta, Ti, W, Mo and Si, and is formed with a thickness of from approximately 100 Å to approximately 1,000 Å.

15. A hard disk drive, comprising:
   at least one hard disk being adapted for rotary motion upon a disk drive;
   at least one slider device having a slider body portion being adapted to fly over said hard disk;
   a magnetic head being formed on said slider body for writing data to said hard disk, said magnetic head including:
   a first magnetic pole;
   a second magnetic pole;
   a write gap layer being disposed between said first and second magnetic poles, where said write gap layer includes at least two sublayers, including an adhesion sublayer and an electrically conductive, non-magnetic sublayer, and wherein said adhesion sublayer is disposed upon said first magnetic pole, and said second magnetic pole is disposed directly upon said electrically conductive, non-magnetic sublayer.

16. A hard disk drive as described in claim 15 wherein said adhesion sublayer is comprised of a material selected from the group consisting of Ta, Ti, Cr and NiCr.

17. A hard disk drive as described in claim 15 wherein said adhesion sublayer is formed with a thickness of from approximately 25 Å to approximately 200 Å.

18. A hard disk drive as described in claim 15 wherein said electrically conductive, non-magnetic sublayer is comprised of a material selected from the group consisting of Rh, Ru, Ir, Mo, W, Au, Be, Pd, Pt, Cu, PtMn, and Ta.

19. A hard disk drive as described in claim 15 wherein said electrically conductive, non-magnetic sublayer is formed with a thickness of from approximately 100 Å to approximately 1000 Å.

20. A hard disk drive as described in claim 15 wherein said second magnetic pole is comprised of a CoFe alloy.

21. A hard disk drive as described in claim 15 wherein said write gap layer also includes a third sublayer that is disposed between said adhesion sublayer and said electrically conductive, non-magnetic sublaver, and wherein said third sublayer is comprised of a material that is etchable in a reactive ion etch process.

22. A hard disk drive as described in claim 21 wherein said third sublayer is formed with a thickness of from approximately 100 to approximately 1,000 Å.

23. A hard disk drive as described in claim 21 wherein said third sublayer is comprised of a material selected from the group consisting of Ta, Ti, W, Mo and Si.

24. A method for fabricating a magnetic head, comprising:
fabricating a first magnetic pole upon a substrate surface;
fabricating a write gap layer upon said first magnetic pole, including the fabrication of an adhesion sublayer upon said first magnetic pole and the fabrication of an electrically conductive, non-magnetic sublayer above said adhesion sablayer;
electroplating a second magnetic pole upon said electrically conductive, non-magnetic sublayer, including the step of passing electrical current through said electrically conductive, non-magnetic sublayer to plate up said second magnetic pole.

25. A method for fabricating a magnetic head as described in claim 24, wherein said adhesion sublayer is comprised of a material selected from the group consisting of Ta, Ti, Cr and NiCr, and is formed with a thickness of from approximately 25 Å to approximately 200 Å.

26. A method for fabricating a magnetic head as described in claim 24 wherein said electrically conductive, non-magnetic sublayer is comprised of a material selected from the group consisting of Rh, Ru, ft. Mo, W, Au, Be; Pd, Pt, Cu, PtMn, and Ta and is formed with a thickness of from approximately 100 Å to approximately 1000 Å.

27. A method for fabricating a magnetic head as described in claim 24 including fabricating a third sublayer between said adhesion sublayer and said electrically conductive, non-magnetic sublayer, and wherein said third sublayer is comprised of a material that is etchable in a reactive ion etch process.

28. A method for fabricating a magnetic head as described in claim 27 wherein said third sublayer is comprised of a material selected from the group consisting of Ta, Ti: W, Mo and Si, is formed with a thickness of from approximately 100 Å to approximately 1,000 Å.

* * * * *